United States Patent
Su et al.

(10) Patent No.: US 10,193,456 B2
(45) Date of Patent: Jan. 29, 2019

(54) PULSE WIDTH MODULATION CONTROLLER AND RELEVANT CONTROL METHOD HAVING MINIMUM ON TIME IN RESPONSE TO VOLTAGE PEAK OF LINE VOLTAGE

(71) Applicant: Leadtrend Technology Corporation, Zhubei, Hsinchu County (TW)

(72) Inventors: Wei Cheng Su, Zhubei (TW); Chi Pin Chen, Zhubei (TW)

(73) Assignee: LEADTREND TECHNOLOGY CORPORATION, Zhubei, Hsinchu County (TW)

( * ) Notice: Subject to any disclaimer, the term of this patent is extended or adjusted under 35 U.S.C. 154(b) by 0 days.

(21) Appl. No.: 15/607,546

(22) Filed: May 29, 2017

(65) Prior Publication Data

US 2017/0353122 A1     Dec. 7, 2017

(30) Foreign Application Priority Data

Jun. 6, 2016   (TW) .............................. 105117790 A

(51) Int. Cl.
*H02M 3/335*     (2006.01)
*H02M 1/00*      (2006.01)

(52) U.S. Cl.
CPC .................. *H02M 3/33523* (2013.01); *H02M 2001/0035* (2013.01); *H02M 2001/0048* (2013.01)

(58) Field of Classification Search
CPC ............................................ H02M 3/335–3/42
See application file for complete search history.

(56) References Cited

U.S. PATENT DOCUMENTS

| 7,116,090 B1 | 10/2006 | Yang et al. | |
| 8,472,214 B2 * | 6/2013 | Huang | H02M 3/33523 363/21.12 |
| 8,829,819 B1 * | 9/2014 | Angeles | H05B 33/0815 315/219 |
| 2010/0026095 A1 * | 2/2010 | Phadke | H02M 3/285 307/31 |
| 2015/0062985 A1 | 3/2015 | Colbeck | |
| 2016/0380528 A1 * | 12/2016 | Gao | H02M 1/15 363/21.12 |

* cited by examiner

*Primary Examiner* — Gary L Laxton
*Assistant Examiner* — Peter Novak
(74) *Attorney, Agent, or Firm* — McClure, Qualey & Rodack, LLP

(57) ABSTRACT

A PWM controller in a switching mode power supply provides to a power switch a PWM signal determining an ON time and an OFF time. A peak detector detects a voltage peak of a line voltage generated by rectifying an alternating-current input voltage. An OFF-time control unit controls the PWM signal and determines the OFF time in response to a compensation voltage, which is in response to an output voltage of the switching mode power supply. An ON-time control unit controls the PWM signal and determines the ON time in response to the compensation voltage and the voltage peak. The ON-time control unit is configured to make the ON time not less than a minimum ON time, and the minimum ON time is determined in response to the voltage peak.

15 Claims, 4 Drawing Sheets

PULSE WIDTH MODULATION CONTROLLER AND RELEVANT CONTROL METHOD HAVING MINIMUM ON TIME IN RESPONSE TO VOLTAGE PEAK OF LINE VOLTAGE

CROSS-REFERENCE TO RELATED APPLICATION

This application claims priority to and the benefit of Taiwan Application Series Number 105117790 filed on Jun. 6, 2016, which is incorporated by reference in its entirety.

BACKGROUND

The present disclosure relates generally to switching mode power supplies, and more particularly to switching mode power supplies with constant ON-time control.

Almost all electronic appliances require power supplies. A power supply converts for example an alternating-current (AC) voltage of a power grid into a power source with specific ratings demanded by the core circuit of an electronic appliance. Among all kind of power supplies, switching mode power supplies are known to be compact in size and efficient in power conversion, and therefore they are broadly adopted by power supply manufactures. Switching mode power supplies normally use pulse width modulation (PWM) technology to control power conversion.

In order to reduce the burden of building a huge power grid system and stabilize the output of a power grid, loads to the power grid are usually required by regulations to have high power factors, and power supplies are no exception. Methods for increasing the power factor of a switching mode power supply include, among others, one-cycle control and constant ON-time control, each having its own benefit over the others. Constant ON-time control is suitable for operating in discontinuous current mode (DCM), and the circuit to implement constant ON-time control is considerably simple. Therefore, constant ON-time control is welcome in the applications of low-power or middle-power switching mode power supplies.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

To achieve high power factor, a switching mode power supply normally rectifies the AC input voltage from a power grid into a direct-current (DC) line voltage, which is then converted into an output voltage to power a load.

In order to reduce switching loss and increase conversion efficiency, a switching mode power supply could enter burst mode operation during a light-load or no-load state. Burst mode operation generally refers to a condition that power conversion from an input voltage to an output voltage of a switching mode power supply continues for several consecutive switching cycles and then discontinues for a long period of time before the power conversion resumes. To make the power conversion of each switching cycle efficient, the ON time of a power switch that mandates the power conversion is limited to not less than a minimum ON time. The ON time of a power switch is usually the minimum ON time if the switching mode power supply with the power switch enters burst mode operation.

According to one embodiment of this invention, the minimum ON time is not a constant, and could vary in response to the change in a voltage peak of a line voltage. For instance, when the line voltage has a voltage peak of 110 volt, the minimum ON time of a power switch is set to be a first minimum ON time; and when the voltage peak changes into 240 volt, the minimum ON time becomes a second minimum ON time, which is less than the first one according to one embodiment of this invention. Power conversion of a switching mode power supply, if well designed to make the minimum ON time depend on a voltage peak of a line voltage, could be substantially independent to the change in the voltage peak.

Figure 1:
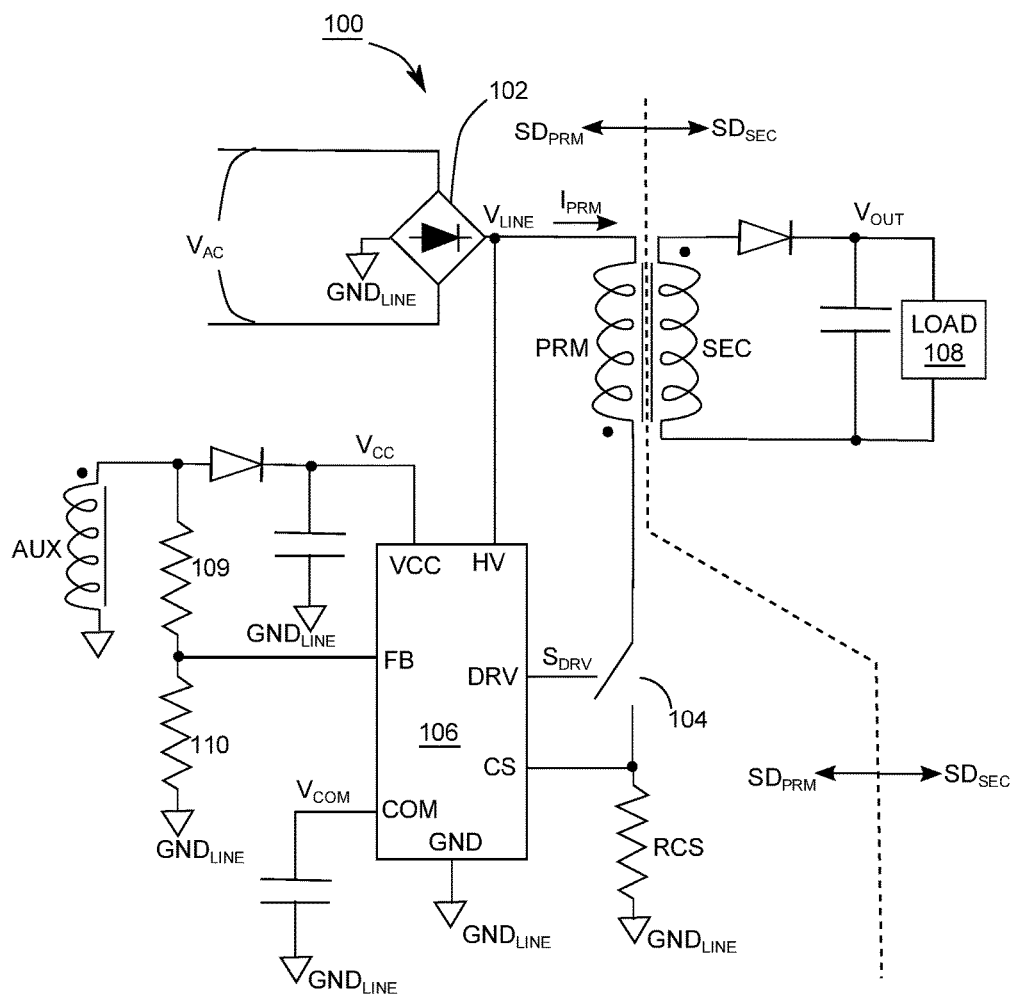
FIG. 1 demonstrates a switching mode power supply according to embodiments of the invention.

FIG. 1 demonstrates a switching mode power supply 100 according to embodiments of the invention. Switching mode power supply 100 employs primary side control (PSC), which controls output voltage $V_{OUT}$ and current precisely with the information in the primary side $SD_{PRM}$ of the power supply only. But this invention is not limited to, however. Embodiments of the invention might use secondary side control (SSC), which relies on the information in the secondary side of a power supply to regulate the output voltage and current.

Bridge rectifier 102 provides full-wave rectification, converting AC input voltage $V_{AC}$ from a power grid into DC line voltage $V_{LINE}$ and primary-side ground $GND_{LINE}$. Input voltage $V_{AC}$ could be 240 VAC or 100 VAC, for example. The transformer in FIG. 1 includes a primary winding PRM, a secondary winding SEC, and an auxiliary winding AUX, all inductively coupled to one another. Primary winding PRM and power switch 104 are connected in series between line voltage $V_{LINE}$ and primary-side ground $GND_{LINE}$. PWM controller 106 provides at drive node DRV pulse width modulation signal $S_{DRV}$ to turn ON or OFF power switch 104. During an ON time when power switch 104 is turned ON to provide a short circuit, line voltage $V_{LINE}$ and primary-side ground $GND_{LINE}$ together energize primary winding PRM. In the opposite, during an OFF time when power switch 104 is turned OFF to provide an open circuit, the energy stored in the transformer releases via secondary winding SEC and/or auxiliary winding AUX to build up operation voltage $V_{CC}$ in the primary side $SD_{PRM}$ and output voltage $V_{OUT}$ in the secondary side $SD_{SEC}$. Operation voltage $V_{CC}$ powers PWM controller 106, and output voltage $V_{OUT}$ load 108.

A voltage divider consisting of resistors 109 and 110 detects the across voltage of auxiliary winding AUX, and the joint between resistors 109 and 110 is connected to feedback node FB of PWM controller 106. The voltage divider could provide to PWM controller 106 information of line voltage $V_{LINE}$ or output voltage $V_{OUT}$.

PWM controller 106 could perform constant ON-time control to make switching mode power supply 100 have an excellent power factor close to 1.

Figure 2:
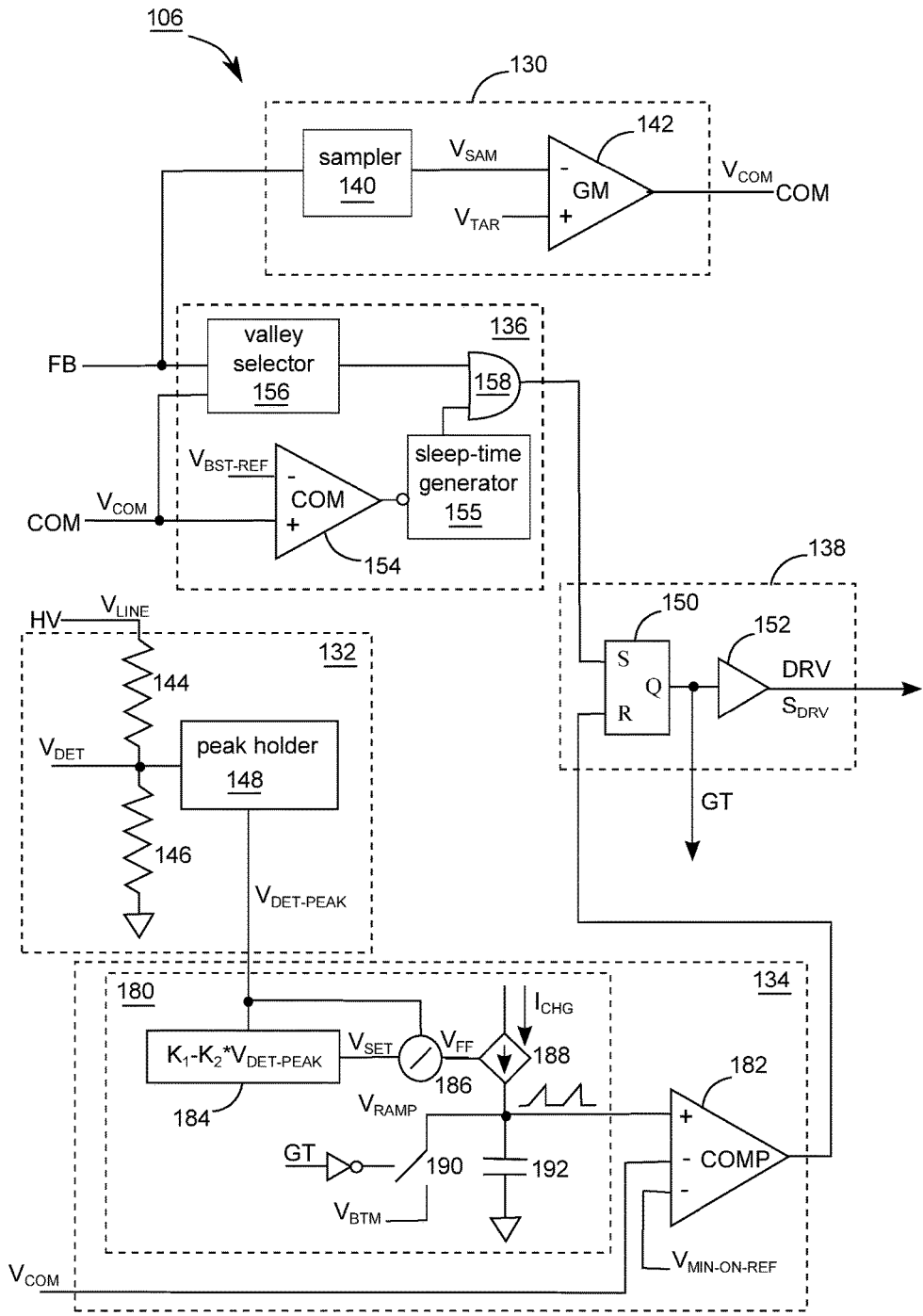
FIG. 2 exemplifies the PWM controller in FIG. 1.

FIG. 2 exemplifies PWM controller 106 in FIG. 1. PWM controller 106 could be in form of a packaged integrated circuit on a monolithic silicon chip, including compensation circuit 130, peak detector 132, OFF-time control unit 136, ON-time control unit 134, and logic unit 138.

Logic unit 138 including SR flip flop 150 and driver 152 provides PWM signal $S_{DRV}$ at drive node DRV. PWM signal $S_{DRV}$ is capable of determining ON time $T_{ON}$ and OFF time $T_{OFF}$ of power switch 104. If SR flip flop 150 is set, driver 152 turns power switch 104 ON, so an OFF time $T_{OFF}$ ends and an ON time $T_{ON}$ starts. When SR flip flop 150 is reset, driver 152 turns power switch 104 OFF, so an ON time $T_{ON}$ ends and an OFF time $T_{OFF}$ starts. A switching cycle $T_{CYC}$ consists of one ON time $T_{ON}$ and one OFF time $T_{OFF}$.

Sampler 140 inside compensation circuit 130 samples the voltage at the feedback node FB during de-energizing of the transformer in FIG. 1, to hold sample signal $V_{SAM}$. According to inductive coupling, sample signal $V_{SAM}$ could be a representative of output voltage $V_{OUT}$. Transconductor 142 compares sample signal $V_{SAM}$ and a target voltage $V_{TAR}$, and accordingly provides compensation voltage $V_{COM}$ at compensation node COM. Compensation voltage $V_{COM}$ is therefore generated in response to output voltage $V_{OUT}$. The higher output voltage $V_{OUT}$ the lower compensation voltage $V_{COM}$. From another technology perspective, PWM controller 106 provides a close loop to make sample signal $V_{SAM}$ about target voltage $V_{TAR}$, and the heavier load 108 the higher compensation voltage $V_{COM}$.

Another embodiment using SSC has an error amplifier, TL431 for example, and a photo coupler in the secondary side $SD_{SEC}$, to replace compensation circuit 130 in the primary side $SD_{PRM}$ of FIG. 2. The error amplifier monitors output voltage $V_{OUT}$, and the photo coupler feeds the output of the error amplifier back to the primary side $SD_{PRM}$ by controlling compensation voltage $V_{COM}$ at compensation node COM.

In other words, compensation voltage $V_{COM}$ could be controlled by compensation circuit 130 inside PWM controller 106 in the primary side $SD_{PRM}$ as shown in FIG. 2, or by circuitry in the secondary side $SD_{SEC}$ that monitors output voltage $V_{OUT}$.

OFF-time control unit 136 has feedback node FB and compensation node COM as inputs, capable of setting SR flip flop 150 to end and conclude an OFF time $T_{OFF}$ of power switch 104. For example, OFF-time control unit 136 has a valley selector 156 that is able to set SR flip flop 150 via AND gate 158 when feedback node FB is determined to be having a voltage valley, thereby achieving valley switching and reducing the switching loss of power switch 104. The voltage valley selected to conclude an OFF time $T_{OFF}$ might be the first voltage valley at feedback node FB during an OFF time $T_{OFF}$, or anyone subsequent to the first voltage valley during the OFF time $T_{OFF}$. Which voltage valley is selected to conclude an OFF time $T_{OFF}$ is for example determined by compensation voltage $V_{COM}$.

Comparator 154 compares compensation voltage $V_{COM}$ with a burst-mode reference voltage $V_{BST-REF}$. When compensation voltage $V_{COM}$ is larger than burst-mode reference voltage $V_{BST-REF}$, valley selector 156 is allowed to set SR flip flop 150. When compensation voltage $V_{COM}$ drops below burst-mode reference voltage $V_{BST-REF}$, valley selector 156 cannot set SR flip flop 150 until the passage of a sleep time $T_{SLEEP}$ determined by sleep-time generator 155. In other words, when compensation voltage $V_{COM}$ happens to go downward and drop across burst-mode reference voltage $V_{BST-REF}$, the present OFF time $T_{OFF}$ will be about sleep time $T_{SLEEP}$, which could be as long as several microseconds.

Figure 3:
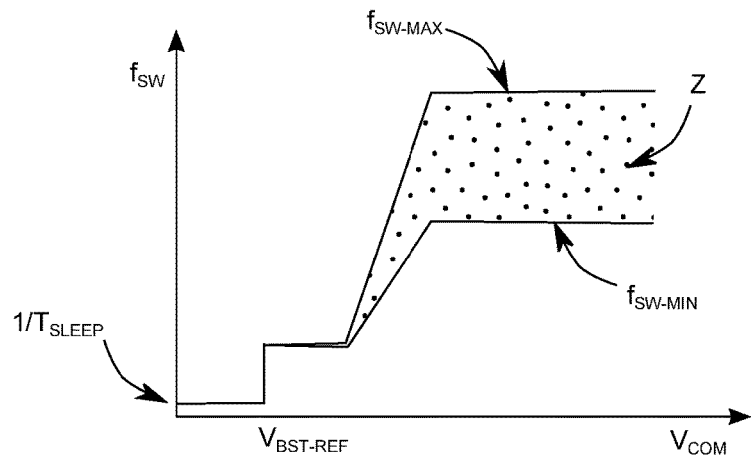
FIG. 3 shows the relationship between switching frequency $f_{SW}$ and compensation voltage $V_{COM}$.

FIG. 3 shows the relationship between switching frequency $f_{SW}$ of power switch 104 and compensation voltage $V_{COM}$ that OFF-time control unit 136 is possibly in control of, where switching frequency $f_{SW}$ is the reciprocal of switching cycle $T_{CYC}$. If compensation voltage $V_{COM}$ is below burst-mode reference voltage $V_{BST-REF}$ switching frequency $f_{SW}$ is as low as about the reciprocal of sleep time $T_{SLEEP}$ because power switch 104 remains OFF until about the passage of sleep time $T_{SLEEP}$. If compensation voltage $V_{COM}$ exceeds burst-mode reference voltage $V_{BST-REF}$ switching frequency $f_{SW}$ is limited to the range between the curves of the maximum switching frequency $f_{SW-MAX}$ and the minimum switching frequency $f_{SW-MIN}$, which is shown in FIG. 3 by dotted region Z. As demonstrated by FIG. 3, each of the maximum switching frequency $f_{SW-MAX}$ and the minimum switching frequency $f_{SW-MIN}$ could correlate with compensation voltage $V_{COM}$ positively.

Figure 4:
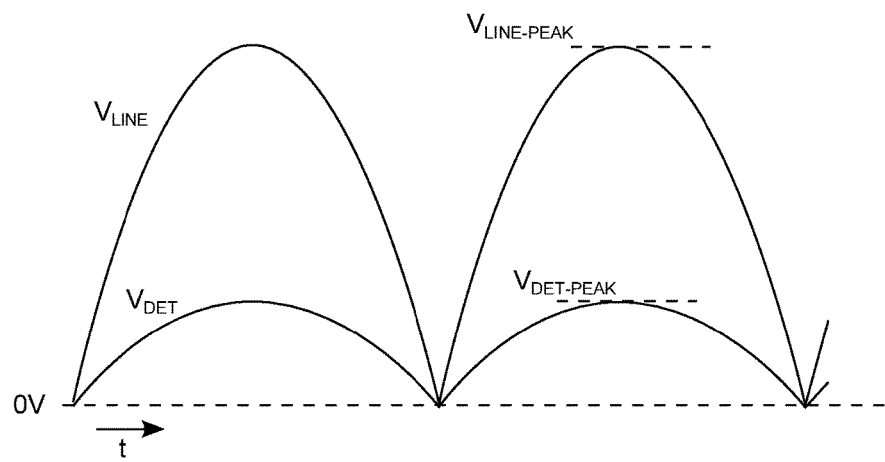
FIG. 4 demonstrates line voltage $V_{LINE}$, detected voltage $V_{DET}$, voltage peak $V_{LINE-PEAK}$, and voltage peak $V_{DET-PEAK}$.

Peak detector 132 detects voltage peak $V_{LINE-PEAK}$ of line voltage $V_{LINE}$ Via high-voltage node HV of PWM controller 106, peak detector 132 is connected to line voltage $V_{LINE}$ The joint between resistors 144 and 146 provides detected voltage $V_{DET}$ in proportion to line voltage $V_{LINE}$. Peak holder 148 generates voltage peak $V_{DET-PEAK}$ in response to detected voltage $V_{DET}$. FIG. 4 demonstrates line voltage $V_{LINE}$, detected voltage $V_{DET}$, voltage peak $V_{LINE-PEAK}$ of line voltage $V_{LINE}$ and voltage peak $V_{DET-PEAK}$ of detected voltage $V_{DET}$, where detected voltage $V_{DET}$ and voltage peak $V_{DET-PEAK}$ are in proportion to line voltage $V_{LINE}$ and voltage peak $V_{LINE-PEAK}$ respectively. Voltage peak $V_{DET-PEAK}$ an internal signal in an integrated circuit, is seemingly equivalent to voltage peak $V_{LINE-PEAK}$ an external signal. Hereinafter, voltage peak $V_{DET-PEAK}$ might be used for detailing circuit operations, but it could be equivalently replaced by voltage peak $V_{LINE-PEAK}$ without any influence to the explanation.

On-time control unit 134 can reset SR flip flop 150 in response to compensation voltage $V_{com}$, so as to turn power switch 104 OFF and to conclude an ON time $T_{ON}$. On-time control unit 134 performs constant ON-time control, which, as named, makes the length of ON time $T_{ON}$ about constant. ON time $T_{ON}$ nevertheless increases if compensation voltage $V_{COM}$ increases, and the detail of dependence between them will be explained later. When compensation voltage $V_{COM}$ is equal to or below a reference voltage $V_{MIN-ON-REF}$, ON time $T_{ON}$, if started, is equal to a minimum ON time $T_{ON-MIN}$, which is determined in response to voltage peak $V_{DET-PEAK}$ and will be detailed later. For example, the minimum ON time $T_{ON-MIN}$ lengthens if the voltage peak $V_{DET-PEAK}$ lessens.

On-time control unit 134 includes ramp signal generator 180 and comparator 182. Ramp signal generator generates periodic ramp signal $V_{RAMP}$ in response to voltage peak $V_{DET-PEAK}$. Synchronized by the signal at node GT from the output of SR flip flop 150, ramp signal $V_{RAMP}$ starts ramping up at the beginning of an ON time $T_{ON}$. Comparator 182 compares ramp signal $V_{RAMP}$ with the bigger one between compensation voltage $V_{COM}$ and reference voltage $V_{MIN-ON-REF}$. When ramp signal $V_{RAMP}$ exceeds both compensation voltage $V_{COM}$ and reference voltage $V_{MIN-ON-REF}$, comparator 182 resets SR flip flop 150, drive 152 in response turns power switch 104 OFF via drive node DRV, and an ON time $T_{ON}$ is concluded. The higher compensation voltage $V_{COM}$, the longer ON time $T_{ON}$, because it takes more time for the ramp signal $V_{RAMP}$ to exceed the higher compensation voltage $V_{COM}$. ON time $T_{ON}$ is never less than minimum ON time $T_{ON-MIN}$ however. ON time $T_{ON}$ is equal to minimum ON time $T_{ON-MIN}$ only if compensation voltage $V_{COM}$ is equal to or below reference voltage $V_{MIN-ON-REF}$. For some embodiments of the invention, reference voltage $V_{MIN-ON-REF}$ is the same with burst-mode reference voltage $V_{BST-REF}$. Other embodiments might have reference voltage $V_{MIN-ON-REF}$ different from burst-mode reference voltage $V_{BST-REF}$.

Ramp signal generator 180 includes first circuit 184, divider 186, voltage-to-current converter 188, reset switch 190, and capacitor 192.

First circuit 184 provide setting signal $V_{SET}$ in response to voltage peak $V_{DET-PEAK}$ by way of a linear transformation. For instance, the relationship between setting signal $V_{SET}$ and voltage peak $V_{DET-PEAK}$ can be expressed by the following equation (1).

$$V_{SET} = K_1 - K_2 V_{DET-PEAK} \quad (1),$$

where $K_1$ and $K_2$ both are positive constants.

Divider 186 divides voltage peak $V_{DET-PEAK}$ by setting signal $V_{SET}$ to generate signal $V_{FF}$ controlling charging current $I_{CHG}$. Divider 186, in one embodiment, is implemented by a translinear circuit. For instance, charging current $I_{CHG}$ can be expressed by the following equation (2).

$$I_{CHG} = \frac{K_3 V_{DET-PEAK}}{K_1 - K_2 V_{DET-PEAK}}. \quad (2)$$

By way of Taylor expansion, equation (2) could become $$I_{CHG} = K_3 V_{DET-PEAK} \times \quad (3)$$
$$(K_{a1} + K_{a2} V_{DET-PEAK} + K_{a3} V_{DET-PEAK}^2 + K_{a4} V_{DET-PEAK}^3 + ...)$$
$$= K_{b1} V_{DET-PEAK} + K_{b2} V_{DET-PEAK}^2 + K_{b3} V_{DET-PEAK}^3 + ...,$$

where all $K_X$ are positive constants. It can be seen from equation (3) that charging current $I_{CHG}$ is capable of being expressed by a polynomial function using voltage peak $V_{DET-PEAK}$ as an indeterminate, and the degree of the polynomial is more than one.

Reset switch 190, during an OFF time $T_{OFF}$ when power switch 104 is turned OFF, is ON and resets ramp signal $V_{AP}$, making it equal to bottom voltage $V_{BTM}$, which is the minimum voltage that ramp signal $V_{RAMP}$ can be. In one embodiment, bottom voltage $V_{BTM}$ is less than burst-mode reference voltage $V_{BST-REF}$. For example, bottom voltage $V_{BTM}$ could be 0V, the voltage of primary-side ground $GND_{LINE}$. For another embodiment of the invention, bottom voltage $V_{BTM}$ could be 2V.

The relationship between ON time $T_{ON}$ and compensation voltage $V_{COM}$ can be expressed by the following equations.

$$I_{CHG} \times T_{on} = C_{192} \times (V_{COM} - V_{BTM}); \quad (4)$$

$$T_{ON} = \frac{C_{192} \times (V_{COM} - V_{BTM})}{I_{CHG}} =$$
$$\frac{C_{192} \times (V_{COM} - V_{BTM})}{K_{b1} V_{DET-PEAK} + K_{b2} V_{DET-PEAK}^2 + K_{b3} V_{DET-PEAK}^3 + ...},$$

where $C_{192}$ is capacitance of capacitor 192.

Replacing compensation voltage $V_{COM}$ in the equation (4) with reference voltage $V_{MIN-ON-REF}$, minimum ON time $T_{ON-MIN}$ can be found from the following equation (5).

$$T_{ON-MIN} = \frac{C_{192} \times (V_{MIN-ON-REF} - V_{BTM})}{K_{b1} V_{DET-PEAK} + K_{b2} V_{DET-PEAK}^2 + K_{b3} V_{DET-PEAK}^3 + ...} \quad (5)$$

Figure 5:
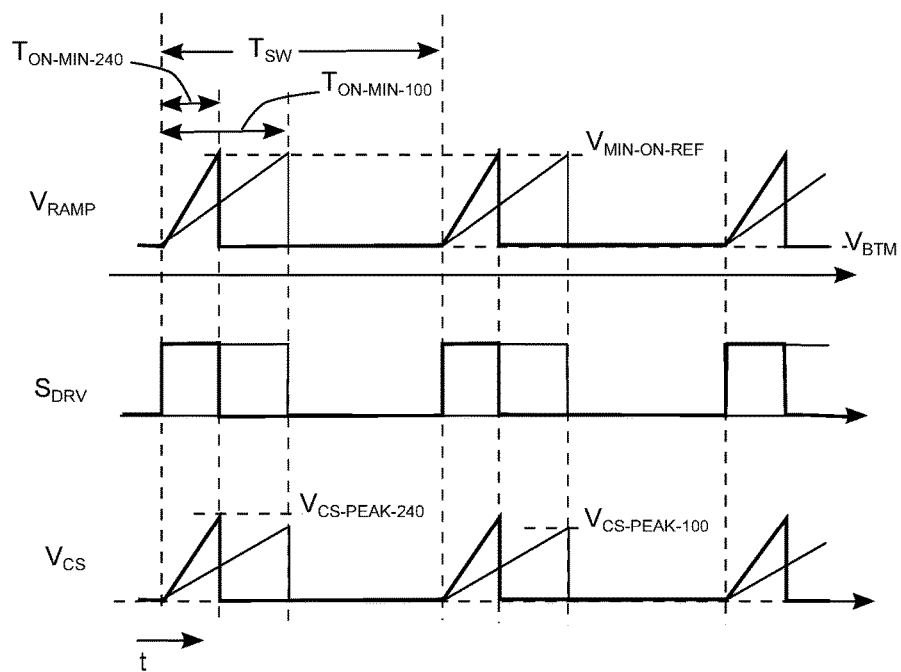
FIG. 5 shows some signal waveforms of signals in the PWM controller of FIG. 2, including ramp signal $V_{AP}$, PWM signal $S_{DRV}$, and current sense signal $V_{CS}$.

FIG. 5 shows some signal waveforms of signals in PWM controller 106, including ramp signal $V_{RAMP}$, PWM signal $S_{DRV}$ and current sense signal $V_{CS}$. Current sense signal $V_{CS}$, at current sense node CS in FIG. 1, could represent inductor current $I_{PRM}$ flowing through primary winding PRM. In light of convenient comparison, each signal in FIG. 5 is drawn to have two signal waveforms, the one with the broader line corresponding to the condition when voltage peak $V_{LINE-PEAK}$ is 240V, and the other with the narrower line the condition when voltage peak $V_{LINE-PEAK}$ is 100V.

It is supposed compensation voltage $V_{COM}$ is equal to or less than reference voltage $V_{MIN-ON-REF}$ in FIG. 5, so power switch 104 operates to have ON time $T_{ON}$ minimum. Minimum ON times $T_{ON-MIN-240}$ and $T_{ON-MIN-100}$ are two minimum ON times $T_{ON}$ corresponding to the conditions when voltage peaks $V_{LINE-PEAK}$ are 240V and 100V respectively. As shown in FIG. 5, Minimum ON time $T_{ON-MIN-240}$ is less than Minimum ON time $T_{ON-MIN-100}$. As derivable from equation (5), it is evident as well that minimum ON time $T_{ON-MIN}$ reduces when voltage peak $V_{DET-PEAK}$ or $V_{LINE-PEAK}$ increases.

Proper design to PWM controller 106 can set constants in equation (5) to make peak values $V_{CS-PEAK-240}$ and $V_{CS-PEAK-100}$ of current sense signal $V_{CS}$, as denoted in FIG. 5, very close to each other. That is, peak value $V_{CS-PEAK}$ of current sense signal $V_{CS}$ could be about independent from voltage peak $V_{LINE-PEAK}$. Peak value $V_{CS-PEAK}$ represents a peak current of inductor current $I_{PRM}$, and is capable of indicating the total energy converted from primary side $SD_{PRM}$ to secondary side $SD_{SEC}$ in one switching cycle $T_{CYC}$. If the change in voltage peak $V_{LINE-PEAK}$ contributes substantially no influence to peak value $V_{CS-PEAK}$ it implies that energy converted in one switching cycle $T_{CYC}$ is about independent from voltage peak $V_{LINE-PEAK}$ of line voltage $V_{LINE}$.

In one embodiment, reference voltage $V_{MIN-ON-REF}$ in the embodiment of FIG. 2 is the same with burst-mode reference voltage $V_{BST-REF}$. When load 108 of switching mode power supply 100 becomes lighter and lighter, compensation voltage $V_{COM}$ drops and if it drops below burst-mode reference voltage $V_{BST-REF}$ switching mode power supply 100 enters burst mode operation. The quantity of load 108 for switching mode power supply 100 entering burst mode operation is hereinafter referred to as burst-mode load. In view of power supply system design, it is preferable the burst-mode load is about a constant independent from line voltage $V_{LINE}$. Switching mode power supply 100 according to embodiments of the invention could make this preference come true. If compensation voltage $V_{COM}$ is equal to burst-mode reference voltage $V_{BST-REF}$ the energy converted in one switching cycle $T_{CYC}$, according to previous analysis, is about independent from voltage peak $V_{LINE-PEAK}$ of line voltage $V_{LINE}$, implying the burst-mode load consuming the energy is independent from voltage peak $V_{LINE-PEAK}$. Therefore, if input voltage $V_{AC}$ changes from 240 VAC to 100 VAC, or vice versa, the burst-mode load of switching mode power supply 100 could remain the same.

Furthermore, by properly setting the constants in equation (4), switching mode power supply 100 could trigger over-load protection when compensation voltage $V_{COM}$ exceeds an over-load reference value $V_{OLP-REF}$, and this over-load reference value $V_{OLP-REF}$ corresponds to a specific load substantially not varying if the input voltage $V_{AC}$ changes from 240 VAC to 100 VAC.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A PWM controller for providing to a power switch a PWM signal determining an ON time and an OFF time of the power switch, the PWM controller comprising:
    a peak detector for detecting a voltage peak of a line voltage generated by rectifying an alternating-current input voltage;
    an OFF-time control unit for controlling the PWM signal and determining the OFF time in response to a compensation voltage, wherein the compensation voltage is in response to an output voltage of a power supply comprising the power switch and the PWM controller; and
    an ON-time control unit for controlling the PWM signal and determining the ON time in response to the compensation voltage and the voltage peak, wherein the ON-time control unit is configured to make the ON time not less than a minimum ON time, and the minimum ON time is determined in response to the voltage peak;
    wherein the ON-time control unit comprises a ramp signal generator for providing a ramp signal compared with the compensation voltage to determine the ON time; and
    the ramp signal generator provides a charging current in response to the voltage peak to charge a capacitor and generate the ramp signal.

2. The PWM controller as claimed in claim 1, wherein the minimum ON time increases when the voltage peak decreases.

3. The PWM controller as claimed in claim 1, wherein the charging current is capable of being expressed by a polynomial function using the voltage peak as an indeterminate, and the degree of the polynomial is more than one.

4. The PWM controller as claimed in claim 1, wherein the ramp signal generator comprises:
    a first circuit for providing a setting signal in response to the voltage peak by way of a linear transformation; and
    a divider for dividing the voltage peak by the setting signal to control the charging current.

5. The PWM controller as claimed in claim 4, wherein the divider is a translinear circuit.

6. The PWM controller as claimed in claim 1, wherein the ramp signal is controlled not to be less than a bottom voltage, and the bottom voltage is higher than a ground voltage.

7. The PWM controller as claimed in claim 6, wherein during the OFF time the ramp signal is reset to be the bottom voltage.

8. The PWM controller as claimed in claim 1, wherein when the compensation voltage is below a reference voltage the ON time is equal to the minimum ON time.

9. The PWM controller as claimed in claim 1, wherein the power switch is connected in series with an inductive device, and during the OFF-time control unit makes the power switch perform valley switching by detecting a cross voltage of the inductive device.

10. A control method suitable for use in a switching mode power supply, wherein the switching mode power supply is powered by a line voltage to output an output voltage, and comprises a power switch and an inductive device, the control method comprising:
    detecting a voltage peak of the line voltage;
    providing a compensation voltage in response to the output voltage;
    providing a PWM signal in response to the compensation signal and the voltage peak, wherein the PWM signal controls the power switch to define an ON time and an OFF time;
    limiting the ON time to not less than a minimum ON time;
    controlling the minimum ON time in response to the voltage peak;
    generating a ramp signal in response to the voltage peak;
    comparing the ramp signal and the compensation voltage to end the ON time; and
    providing a charging current in response to the voltage peak to charge a capacitor and generate the ramp signal.

11. The control method as claimed in claim 10, wherein the charging current is capable of being expressed by a polynomial function using the voltage peak as an indeterminate, and the degree of the polynomial is more than one.

12. The control method as claimed in claim 10, comprising:
    providing a setting signal in response to the voltage peak by way of a linear transformation; and
    dividing the voltage peak by the setting signal to control the charging current.

13. The control method as claimed in claim 10, comprising:
    resetting the ramp signal to be a bottom voltage during the OFF time.

14. The control method as claimed in claim 10, comprising:
    detecting a cross voltage of the inductive device to provide the PWM signal and make the power switch perform valley switching.

15. The control method as claimed in claim 10, comprising:
    providing a reference voltage; and
    making the ON time equal to the minimum ON time if the compensation voltage is below the reference voltage.

* * * * *